(12) United States Patent
Plestid et al.

(10) Patent No.: US 7,634,253 B2
(45) Date of Patent: Dec. 15, 2009

(54) DATA SESSION AUTHENTICATION CREDENTIALS UPDATE FOR A WIRELESS COMMUNICATION DEVICE

(75) Inventors: Thomas Leonard Trevor Plestid, Ottawa (CA); Allan D. Lewis, New Dundee (CA); Ian M. Patterson, Petersburg (CA)

(73) Assignee: Research In Motion Limited, Waterloo, Ontario (CA)

( * ) Notice: Subject to any disclaimer, the term of this patent is extended or adjusted under 35 U.S.C. 154(b) by 115 days.

(21) Appl. No.: 11/213,571

(22) Filed: Aug. 26, 2005

(65) Prior Publication Data

US 2007/0077914 A1   Apr. 5, 2007

(51) Int. Cl.
*H04M 1/66* (2006.01)

(52) U.S. Cl. .................. 455/411; 455/436; 455/439; 455/442; 455/451; 455/452.1; 455/453; 370/395.41; 370/230; 370/231; 370/235; 370/278; 370/282; 370/329; 370/360; 370/395.2; 379/15.01; 379/91.02

(58) Field of Classification Search .................. 455/410, 455/411, 436, 439, 442, 445, 451, 452.1, 455/453; 370/395.41, 230, 231, 235, 278, 370/282, 289, 360, 395.2; 379/15.01, 91.02
See application file for complete search history.

(56) References Cited

U.S. PATENT DOCUMENTS 6,223,030 B1 * 4/2001 Van Den Heuvel et al. .................. 455/435.2

(Continued)

FOREIGN PATENT DOCUMENTS

EP   1494429 A2   1/2005

EP   1494429 A2   5/2005

OTHER PUBLICATIONS

Global Platform, "Global Platform Card Specification v2.0.1", Global Platform Standard Specification, Apr. 7, 2000; pp. 1-183, XP-002362776, URL: http//www.globalplatform.org/specifications/archived/card-tech-201.zip>.

(Continued)

*Primary Examiner*—Rafael Pérez-Gutiérrez
*Assistant Examiner*—Nimesh Patel
(74) *Attorney, Agent, or Firm*—John J. Oskorep, Esq.

(57) ABSTRACT

A method (200) and an apparatus (300) in a wireless portable communication device (102) for maintaining appropriate authentication credentials required for a common data application in a current service network are provided. A method (400) in a wireless communication network (106) for providing current authentication credentials required for the common data application accessible through the wireless communication network (106) is also provided. The wireless portable communication device (102) has default authentication credentials required for the common data application in a default service network (106), receives (204) a data session configuration file including authentication credentials based upon a predetermined condition, prioritizes (206) between the default authentication credentials and the received authentication credentials, and uses (208) the authentication credentials having higher priority for the common data application in the current service network (110). The wireless communication network (106) maintains (404) the current authentication credentials indicative of currently required authentication credentials for the common data application, detects (406) a predetermined condition for transmitting the data session configuration file, and transmits (408) the data session configuration file having the current authentication credentials. Upon receiving (410), the wireless communication network (106) allows (412) proper access to the common data application upon receiving the current authentication credentials.

42 Claims, 4 Drawing Sheets

U.S. PATENT DOCUMENTS

| | | | |
|---|---|---|---|
| 6,480,580 B1* | 11/2002 | Beswick et al. | 379/88.13 |
| 2003/0083041 A1* | 5/2003 | Kumar et al. | 455/406 |
| 2003/0131110 A1 | 7/2003 | Chang et al. | |
| 2003/0191949 A1* | 10/2003 | Odagawa | 713/186 |
| 2003/0204734 A1 | 10/2003 | Wheeler | |
| 2004/0242229 A1 | 12/2004 | Okazaki | |
| 2004/0268148 A1* | 12/2004 | Karjala et al. | 713/201 |
| 2005/0164737 A1* | 7/2005 | Brown | 455/558 |
| 2005/0202841 A1* | 9/2005 | Brobston et al. | 455/552.1 |
| 2005/0282544 A1* | 12/2005 | Oommen et al. | 455/432.1 |
| 2006/0183477 A1* | 8/2006 | Bocking et al. | 455/435.2 |

OTHER PUBLICATIONS

WAP-FORUM, "Provisioning Architecture Overview WAP-182-ProvArch-20010314-a", WAP Standard, Mar. 14, 2001, pp. 1-22, XP002253357.

WAP-FORUM, "Provisioning Bootstrap WAP-184-ProvBoot-20010314-a", WAP Standard, Mar. 14, 2001, pp. 1-24, XP002253355.

Search Report for European Patent Application #05255260.1, Mar. 13, 2006.

Extended European Search Report for EPO patent application 07112952.2, Jan. 18, 2008.

Wireless Application Protocol WAP-182-Prov Arch-20010314-a Provisioning Architecture Overview Version Mar. 14, 2001.

Wireless Application Protocol WAP-182-Prov Arch-20010314-a Provisioning Bootstrap Version Mar. 14, 2001.

* cited by examiner exploration# DATA SESSION AUTHENTICATION CREDENTIALS UPDATE FOR A WIRELESS COMMUNICATION DEVICE

FIELD OF THE INVENTION

The present invention generally relates to data service portability between wireless operators for a wireless communication device, and more specifically to dynamically updating data session authentication credentials of the wireless communication device as applicable to various wireless operators.

BACKGROUND OF THE INVENTION

In a typical wireless portable communication device, a common data application using a common data service available across multiple wireless operator's networks, such as BlackBerry™, instant messaging ("IM"), multimedia messaging service ("MMS"), and/or push-to-talk over cellular ("PoC") available on Internet and/or a private network, is loaded at the manufacturer. Such wireless portable communication devices are shipped to multiple wireless service operators who require the use of different data authentication credentials for the common data application. For example, in a Code-Division Multiple Access ("CDMA") 2000 1x Radio Transmission Technology ("1xRTT") network, where 1x refers to a single radio channel, for a third generation ("3G") mobile system, a network access identifier ("NAI") is used for a point-to-point protocol ("PPP"), and in a General Packet Radio Service ("GPRS"), an access point name ("APN") is used for a packet data protocol ("PDP") contexts.

For a particular wireless service operator, a specific data authentication is generally hard-coded into the wireless portable communications devices allocated for the particular wireless service operator as an operator customization. This method is the accepted practice in the industry, as it is highly desirable from a user's perspective, and obviates any need for the user to maintain knowledge of data authentication credentials. For example, an APN specifying a wireless bearer path for e-mail over one wireless service operator would be different from an APN for e-mail over another wireless service operator regardless of the fact that these wireless service operators may use the same server on the Internet. With local number portability laws in certain jurisdictions, such as those in the United States and European Union, subscribers are now allowed to switch wireless carriers while retaining the same telephone numbers in some circumstances. Generally, the local number portability relates to subscriber identification module ("SIM") lock for Global System for Mobile communications ("GSM") and GPRS networks, or Mobile Directory Number ("MDN") access as compared to International Mobile Subscriber Identity ("IMSI") in CDMA networks. However, with the prevalence of data centric wireless portable communication devices, some subscribers may wish not only to retain the current telephone numbers with a new wireless service provider, but also to continue using the same wireless portable communication devices and its data applications with the new wireless communication service provider.

DETAILED DESCRIPTION OF THE PREFERRED EMBODIMENTS

A wireless portable communication device receives an up-to-date authentication credentials required for a common data application in a wireless communication network in which the wireless portable communication device is currently registered. The up-to-date authentication credentials may include a list of a plurality of wireless communication networks mapped against the up-to-date authentication credentials. The wireless portable communication device may receive the up-to-date authentication credentials periodically at a predetermined interval, based upon a predetermined condition, or by requesting the up-to-date authentication credentials. The up-to-date authentication credentials are then prioritized over existing authentication credentials, and are used for the common data application in the wireless communication network in which the wireless portable communication device is currently registered. The wireless communication network, which requires authentication credentials for the common data application, keeps the required authentication credentials up to date, and transmits the up-to-date authorization credentials periodically at a predetermined interval, based upon a predetermined condition, or in response to receiving a request for the up-to-date authentication credentials. The wireless communication network allows the wireless portable communication device having the up-to-date authentication credentials a use of the common data application.

Figure 1:
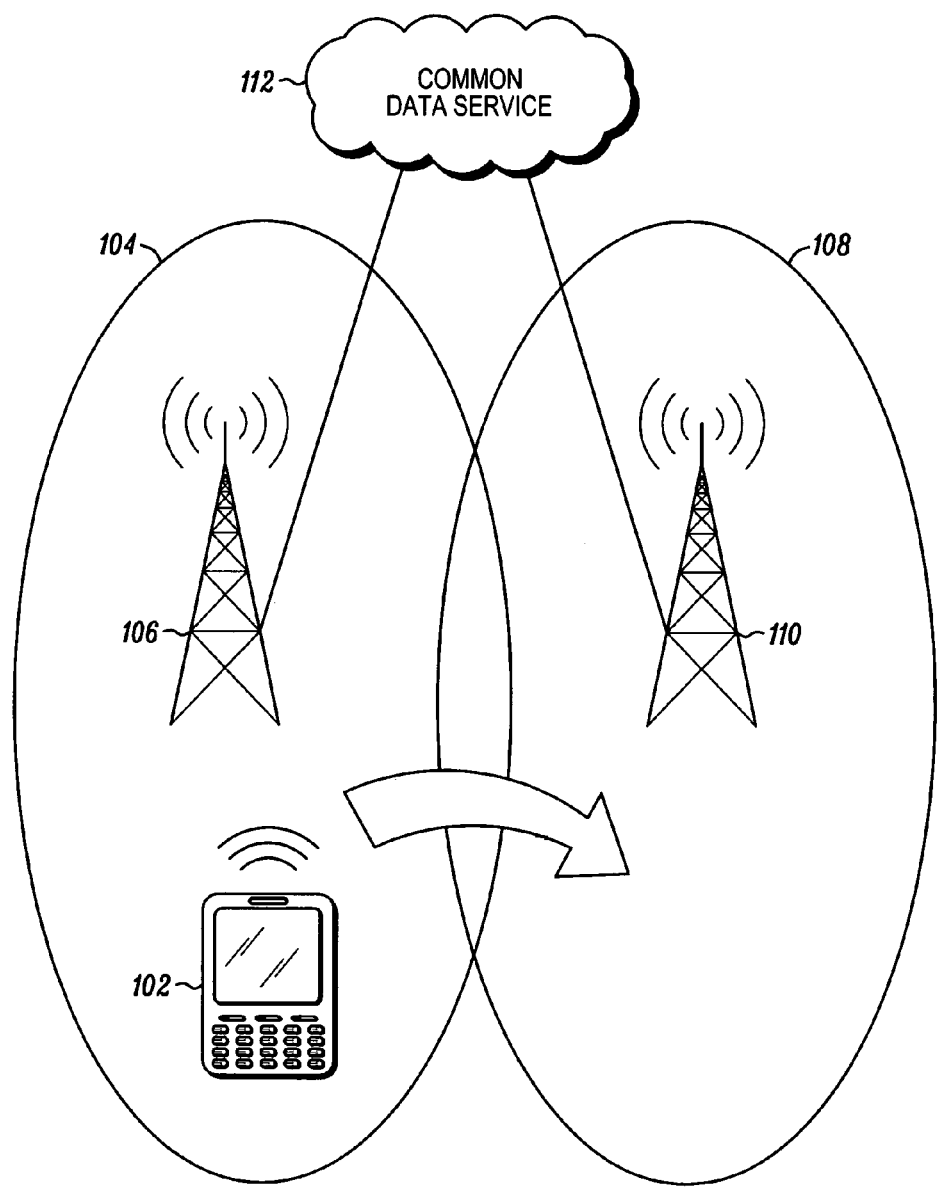
FIG. 1 is an exemplary environment in which a wireless portable communication device in accordance with at least one of the preferred embodiments may be practiced.

FIG. 1 is an exemplary environment 100 in which a wireless portable communication device 102 in accordance with at least one of the preferred embodiments may be practiced. The wireless portable communication device 102 is presently shown to be located in a first coverage area 104 supported by a first wireless communication network 106, which is adjacent to a second coverage area 108 supported by a second wireless communication network 110. The wireless portable communication device 102 has default authentication credentials for a common data application such as an e-mail application, which is maintained in a common service 112, accessed through the first wireless communication network 106. While the wireless portable communication device 102 is within the first coverage area 104 and is registered to the first wireless communication network 106, the wireless portable communication device 102, having the default authentication credentials fully compatible with the first wireless communication network 106, properly accesses the common data application. However, as the wireless portable communication device 102 moves from the first coverage area 104 to the second coverage area 108 and re-registers to the second wireless communication network 110, the default authentication credentials of the wireless portable communication device 102 may not be compatible to access the common data application in the second wireless communication network 110. For an exemplary case where the user is permanently changing his subscription to the operator of the wireless communication network 110, the wireless portable communication device 102 therefore needs to able to update the default authentication credentials to new authentication credentials that are compatible in the second wireless communication network 110 before being able to properly access the common data application. Further, the first wireless communication network 106 may change the default authentication credentials from time to time, and may cause the wireless portable communication device 102 to fail to access the common data application properly. Therefore, the wireless portable communication device 102 needs to be able to maintain up-to-date authentication credentials.

Figure 2:
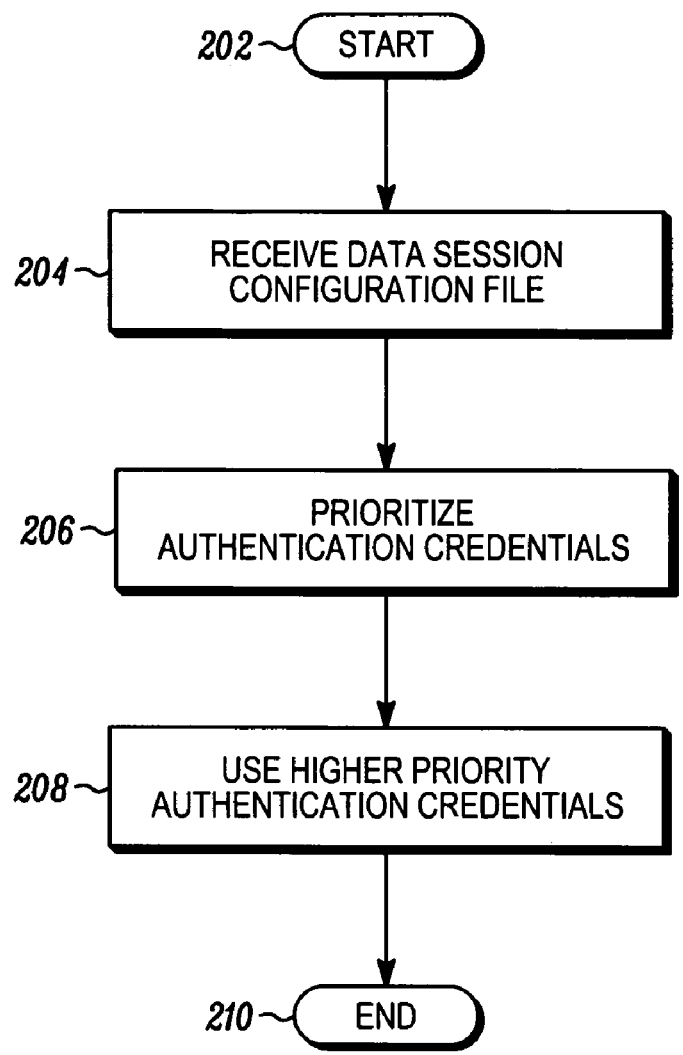
FIG. 2 is an exemplary flowchart illustrating a process in the wireless portable communication device for maintaining up-to-date authorization credentials for accessing the common data application in accordance with at least one of the preferred embodiments.

FIG. 2 is an exemplary flowchart 200 illustrating a process in the wireless portable communication device 102 for maintaining up-to-date authorization credentials for accessing the common data application in accordance with at least one of the preferred embodiments. The wireless portable communication device 102 has default authentication credentials required for the common data application in a default service network, which is the first wireless communication network 106. The process begins in block 202, and the wireless portable communication device 102 receives a data session configuration file, which includes authentication credentials in block 204. The wireless portable communication device 102 may typically receive the data session configuration file wirelessly from the current wireless communication network, but it may alternatively receive the data session configuration file by downloading from the internet. The data session configuration file may further include a list of a plurality of service networks mapped against the received authentication credentials for use with the common data application. This plurality applies as the user subscriptions to a plurality of wireless network operators change. The wireless portable communication device 102 may receive the data session configuration file based upon various conditions. The wireless portable communication device 102 may transmit a request to receive the data session configuration file, or may receive the data session configuration file based upon a predetermined condition. For example, the wireless portable communication device 102 may receive the data session configuration file upon registering to the current service network using a common registration channel, upon failing to properly access the common data application in the current service network, or upon roaming from the default service network to the current service network. The wireless portable communication device 102 may also autonomously receive the data session configuration file periodically.

The wireless portable communication device 102 may further determine the compatibility associated with the wireless portable communication device 102, a subscriber identity module in the wireless portable communication device 102, and the current wireless communication network, and may receive the data session configuration file based upon the compatibility. The subscriber identity module may be one of a Subscriber Identity Module ("SIM") used in networks based upon Global System for Mobile Communications ("GSM"), a Removable User Identification Module ("R-UIM") used in networks based upon Code Division Multiple Access ("CDMA"), or any other similar subscriber identification module.

In block 206, the wireless portable communication device 102 prioritizes the authentication credentials between the default authentication credentials and the received authentication credentials. For example, as previously shown in FIG. 1, when the wireless portable communication device 102 receives new authentication credentials as a result of moving from the first wireless communication network 106 to the second wireless communication network 110 requiring the new authorization credentials to access the common data application, the new received authorization credentials are prioritized over the default authorization credentials. Once prioritized, the default authentication credentials may be overwritten with the received authentication credentials, making the received authentication credentials as new default authentication credentials. Alternatively, both the default authentication credentials and the received authentication credentials are stored in the wireless portable communication device 102, and may be available for later usage. In block 208, the wireless portable communication device 102 uses the authentication credentials having higher priority for the common data application in the current service network. The authorization credentials may be re-prioritized when the wireless portable communication device 102 moves back to the first wireless communication network 106. The process then ends in block 210.

Figure 3:
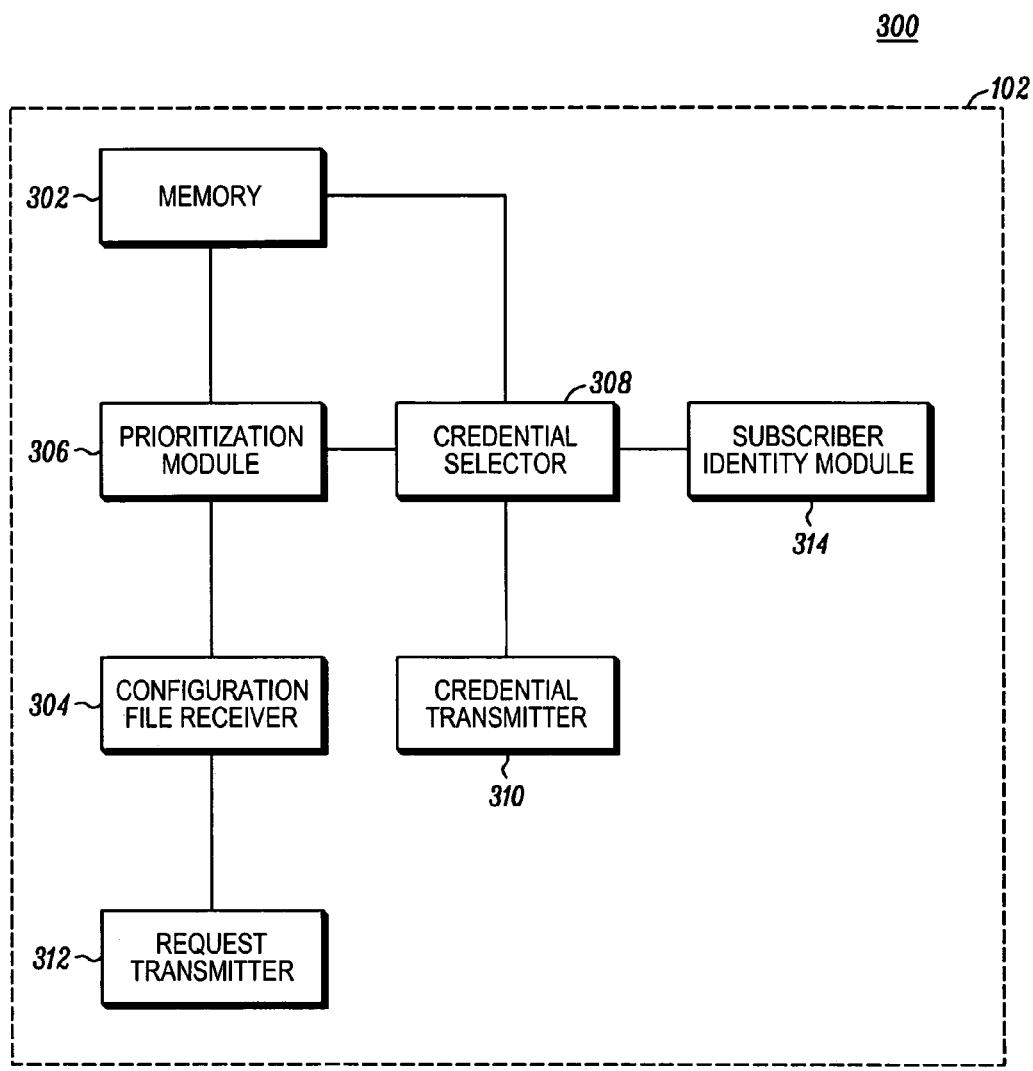
FIG. 3 is an exemplary block diagram of the wireless portable communication device configured to maintain appropriate authentication credentials required for the common data application in the current service network in accordance with at least one of the preferred embodiments.

FIG. 3 is an exemplary block diagram 300 of the wireless portable communication device 102 configured to maintain appropriate authentication credentials required for the common data application in the current service network in accordance with at least one of the preferred embodiments. A battery, a display, a keypad, a speaker, a microphone, an antenna, and other normally associated components are understood to be present but are not specifically shown with the wireless portable communication device 102 for simplicity. The wireless portable communication device 102 has in memory 302 default authentication credentials, which are required for the common data application in a default service network, such as the first wireless communication network 104. The wireless portable communication device 102 has a configuration file receiver 304, which is configured to receive a data session configuration file. The data session configuration file includes authentication credentials, and may further include a list of a plurality of service network mapped against the received authentication credentials for use with the common data application. A prioritization module 306 is coupled to the configuration file receiver 304 and to the memory 302, and is configured to prioritize between the default authentication credentials and the received authentication credentials. A credential selector 308 is coupled to the prioritization module 306, and is configured to select the authentication credentials having higher priority for the common data application in the current service provider. A credential transmitter 310 is coupled to the credential selector 308, and is configured to transmit the selected authorization credentials for the common data application in the current service network. The wireless portable communication device 102 may further have a request transmitter 312, which is coupled to the configuration file receiver 304 and is configured to transmit a request to receive the data session configuration file. The memory 302 may be further coupled to the credential selector 308, and be further configured to be overwritten with the authentication credentials selected by the credential selector 308. The memory 302 may comprise volatile and non-volatile memory modules, having the default authentication credentials programmed in the non-volatile memory module and having the received authentication credentials in the volatile memory module.

The wireless portable communication device 102, specifically the configuration file receiver 304, may be further configured to receive the data session configuration file based upon various predetermined conditions. For example, the configuration file receiver 304 may be configured to receive the data session configuration file upon registration of the wireless portable communication device 102 to the current service provider using a common registration channel, upon failure of the wireless portable communication device 102 to properly access the common data application in the current service provider, or upon the wireless portable communication device 102 roaming from the default service network to the current service network. The configuration file receiver 304 may be further configured to autonomously receive the data session configuration periodically. Further, the bearer path may be entirely independent from the wireless network for receipt of the configuration file, for example, it may be downloaded off of the internet to the wireless portable communication device 102.

The wireless portable communication device 102 may further comprise a subscriber identity module 314 such as a Subscriber Identity Module ("SIM") used in networks based upon Global System for Mobile Communications ("GSM") and a Removable User Identification Module ("R-UIM") used in networks based upon Code Division Multiple Access ("CDMA") or via the service programming implemented directly on the wireless portable communication device 102 where no R-UIM is present. The subscriber identity module 314 is coupled to the credential selector 308, and is configured to provide information to the current service network, such as the first wireless communication network 106 regarding the identity of a subscriber and associated services. Although typically a wireless portable communication device and its subscriber identity module are associated with the same wireless communication network provider, because the subscriber identity module is fully or partially compatible with similar wireless portable communication devices, the subscriber identity module associated with one wireless communication service provider may be used with a wireless portable communication device associated with another wireless communication service provider. Further, as a result of roaming or user subscription changes to other operators, such a combination of the wireless portable communication device and the subscriber identity module may register and operate in yet another wireless communication service provider's network. The configuration file receiver 304 may further be configured receive the data session configuration file based upon the compatibility among the wireless portable communication device 102, the subscriber identity module 314, and the current wireless communication network.

Figure 4:
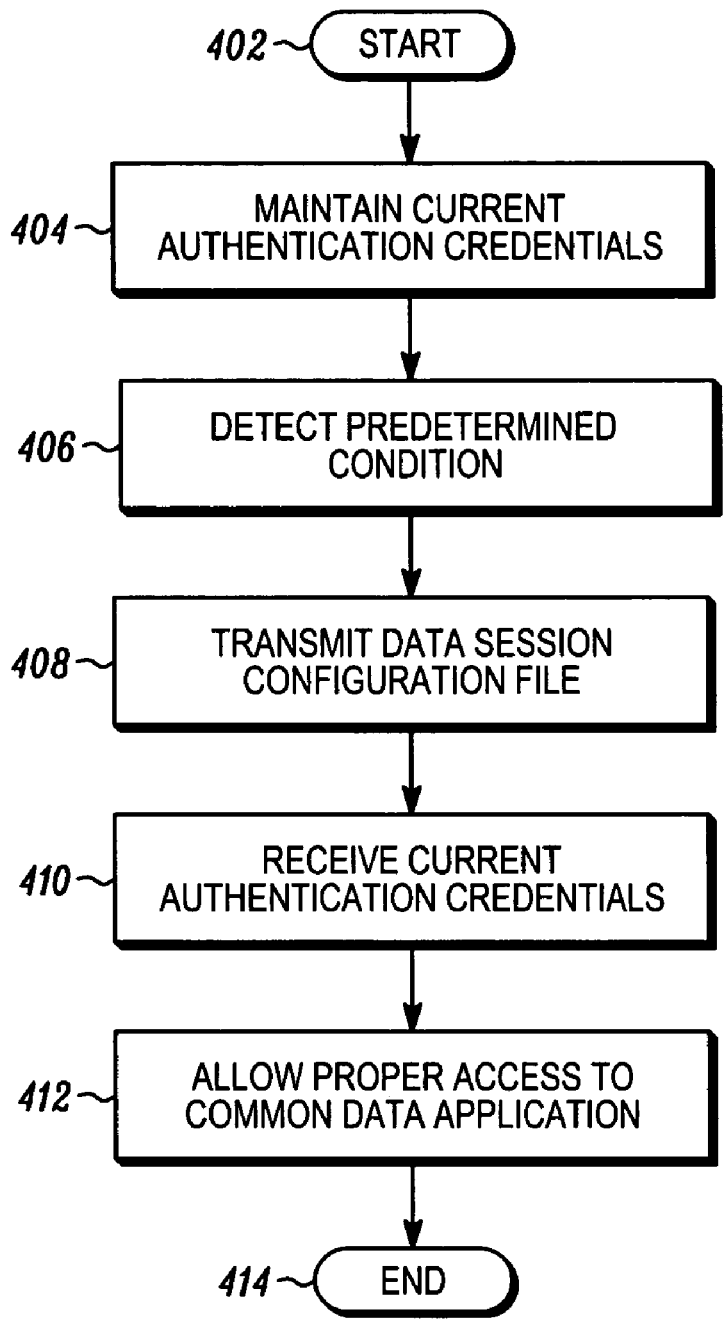
FIG. 4 is an exemplary flowchart illustrating a process in the wireless communication network for providing current authentication credentials required for the common data application accessible through the wireless communication network in accordance with at least one of the preferred embodiments.

FIG. 4 is an exemplary flowchart 400 illustrating a process in the wireless communication network 106 for providing current authentication credentials required for the common data application accessible through the wireless communication network 106 in accordance with at least one of the preferred embodiments. The first wireless communication network 106 is simply referred as the wireless communication network 106 for this illustration. The process begins in block 402, and the wireless communication network 106 maintains the current, or up-to-date, authentication credentials indicative of currently required authentication credentials for the common data application in block 404. The wireless communication network 106 may maintain the current authentication credentials in various ways including, but not limited to, acquiring the current authentication credentials by communicating with common data service 112 periodically, and receiving the current authentication credentials from the common data service 112 as they are updated. The wireless communication network 106 then detects a predetermined condition for transmitting a data session configuration file in block 406. Alternatively, the common data service 112 may detect the predetermined condition through the wireless communication network 106. The data session configuration file includes the current authentication credentials, and may further include a list of a plurality of wireless communication networks mapped against the appropriate authentication credentials for use with the common data application. The predetermined condition to be detected in block 406 for transmitting the data session configuration may be one of various predetermined conditions including, but not limited to, receiving a request for the data session configuration file, receiving a registration of a wireless portable communication device using a common registration channel, determining a registered wireless portable communication device failing to properly access the common data application, and reaching a predetermined periodic transmission time interval. As one of the predetermined conditions, the wireless communication network 106, or the common data service 112, may further determine the compatibility associated with a wireless portable communication device registered in the wireless communication network 106, such as the wireless portable communication device 102, a subscriber identity module in the wireless portable communication device 102, and the wireless communication network 106 itself. The subscriber identity module may be one of a Subscriber Identity Module ("SIM") used in networks based upon Global System for Mobile Communications ("GSM"), a Removable User Identification Module ("R-UIM") used in networks based upon Code Division Multiple Access ("CDMA"), or any other similar subscriber identification module.

Upon detecting one of the predetermined conditions in block 406, the wireless communication network 106, or the common data service 112, transmits the data session configuration file in block 408, generally only to the wireless portable communication device 102, which triggered the predetermined condition detection process. Alternatively, the wireless communication network 106, or the common data service 112, may broadcast the data session configuration file periodically to all wireless portable communication devices currently registered to the wireless communication network 106. Upon receiving the current authentication credentials from the wireless portable communication device 102 in block 410, the wireless communication network 106 allows the wireless portable communication device 102 proper access to the common data application in block 412. The process then terminates in block 414.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method in a wireless portable communication device for use in maintaining appropriate authentication credentials for accessing a common data application maintained in a common service network for receiving a messaging service, the wireless portable communication device having default authentication credentials for submission when establishing, via a default cellular network, data connectivity for accessing the common data application maintained in the common service network for receiving the messaging service via the default cellular network, the method comprising the acts of:

in response to a change in subscription for the wireless portable communication device from the default cellular network to a current cellular network: receiving, via the current cellular network, a data session configuration file including authentication credentials for submission when establishing, via the current cellular network, data connectivity for accessing the common data application maintained in the common service network;

prioritizing between the default authentication credentials and the received authentication credentials; and using the received authentication credentials corresponding to the current cellular network for submission when establishing, via the current cellular network, the data connectivity for accessing the common data application maintained in the common service network for receiving the messaging service via the current cellular network.

2. The method of claim 1, wherein the data session configuration file further includes a list of a plurality of communication networks mapped against the received authentication credentials for use with the common data application maintained in the common service network.

3. The method of claim 1, further comprising:
transmitting a request to receive the data session configuration file before receiving the data session configuration file.

4. The method of claim 1, further comprising:
overwriting the default authentication credentials with the received authentication credentials after prioritizing between the default authentication credentials and the received authentication credentials.

5. The method of claim 4 further comprising:
making the received authentication credentials as new default authentication credentials.

6. The method of claim 1, wherein receiving the data session configuration file includes receiving the data session configuration file upon registering the wireless portable communication device to the current cellular network using a common registration channel.

7. The method of claim 1, wherein receiving the data session configuration file includes receiving the data session configuration file upon failing to properly access the common data application maintained in the common service network via the current cellular network.

8. The method of claim 1, wherein receiving the data session configuration file includes autonomously receiving the data session configuration file periodically.

9. The method of claim 1, wherein receiving the data session configuration file includes receiving the data session configuration file upon roaming from the default cellular network to the current cellular network.

10. The method of claim 1, wherein the common data application comprises an e-mail application for a messaging service comprising an e-mail message service.

11. The method of claim 1, wherein the authentication credentials comprise an access point name (APN) and the data connectivity comprises a packet data protocol (PDP) context.

12. The method of claim 1, wherein the authentication credentials comprise a network access identifier (NAI) and the data connectivity comprises a point-to-point protocol (PPP) session.

13. A wireless portable communication device configured to maintain appropriate authentication credentials for accessing a common data application maintained in a common service network for receiving a messaging service, the wireless portable communication device having default authentication credentials stored in memory, the default authentication credentials for submission when establishing, via a default cellular network, data connectivity for accessing the common data application maintained in the common service network for receiving the messaging service via the default cellular network, the wireless portable communication device comprising:

a configuration file receiver configured to receive a data session configuration file including authentication credentials based on a change in subscription from the default cellular network to a current cellular network, the received authenticated credentials for submission when establishing, via the current cellular network, data connectivity for accessing the common data application maintained in the common service network;

a prioritization module coupled to the configuration file receiver and to the memory, the prioritization module configured to prioritize between the default authentication credentials and the received authentication credentials;

a credential selector coupled to the prioritization module, the credential selector configured to select the received authentication credentials corresponding to the current cellular network for accessing the common data application maintained in the common service network; and a credential transmitter coupled to the credential selector, the credential transmitter configured to transmit the selected authorization credentials when establishing, via the current cellular network, data connectivity for accessing the common data application maintained in the common service network for receiving the messaging service via the current cellular network.

14. The wireless portable communication device of claim 13, wherein the data session configuration file further includes a list of a plurality of cellular networks mapped against the received authentication credentials for use with the common data application maintained in the common service network.

15. The wireless portable communication device of claim 13 further comprising:
a request transmitter coupled to the configuration file receiver, the request transmitter configured to transmit a request to receive the data session configuration file.

16. The wireless portable communication device of claim 13, wherein the authentication credentials comprise an access point name (APN) and the data connectivity comprises a packet data protocol (PDP) context.

17. The wireless portable communication device of claim 13, wherein the configuration file receiver is further configured to receive the data session configuration file upon registration of the wireless portable communication device to the current cellular network using a common registration channel.

18. The wireless portable communication device of claim 13, wherein the configuration file receiver is further configured to receive the data session configuration file upon failure of the wireless portable communication device to properly access the common data application maintained in the common service network via the current cellular network.

19. The wireless portable communication device of claim 13, wherein the configuration file receiver is further configured to autonomously receive the data session configuration periodically.

20. The wireless portable communication device of claim 13, wherein the configuration file receiver is further configured to receive the data session configuration file upon the wireless portable communication device roaming from the default cellular network to the current cellular network.

21. The wireless portable communication device of claim 13, wherein authentication credentials comprise a network access identifier (NAI) and the data connectivity comprises a point-to-point protocol (PPP) session.

22. The wireless portable communication device of claim 13, wherein the configuration file receiver is further configured to receive the data session configuration file upon a determination that a subscriber identity module used in the wireless portable communication device is associated with a different cellular network from at least one of:
 a cellular network associated with the wireless portable communication device, and
 the current cellular network.

23. The wireless portable communication device of claim 22, wherein the subscriber identity module is at least one of:
 a Subscriber Identity Module used in networks based upon Global System for Mobile Communications, and
 a Removable User Identification Module used in networks based upon Code Division Multiple Access.

24. A method in a cellular network for use in providing appropriate authentication credentials required for submission by a wireless portable communication device when it establishes, via the cellular network, data connectivity for accessing a common data application maintained in a common service network adapted to provide a messaging service, the wireless portable communication device having default authentication credentials required for submission when it establishes, via a default cellular network, data connectivity for accessing the common data application maintained in the common service network for receiving the messaging service via the default cellular network, the method comprising the acts of:
 maintaining current authentication credentials required for submission by the wireless portable communication device when it establishes, via the cellular network, data connectivity for accessing the common data application maintained in the common service network;
 detecting a predetermined condition which is based on a change in subscription for the wireless portable communication device from the default cellular network to the cellular network;
 transmitting a data session configuration file having the current authentication credentials in response to detecting the predetermined condition; and
 allowing proper access to the common data application maintained in the common service network for providing the messaging service to the wireless portable communication device via the cellular network upon receiving the current authentication credentials from the wireless portable communication device when the data connectivity is established via the cellular network.

25. The method of claim 24, wherein maintaining the current authentication credentials indicative of currently authentication credentials for the common data application includes receiving the currently authentication credentials for the common data application from the common service network.

26. The method of claim 24, wherein detecting a predetermined condition for transmitting a data session configuration file includes detecting the predetermined condition by the common data service network.

27. The method of claim 24, wherein the data session configuration file further includes a list of a plurality of cellular networks mapped against the appropriate authentication credentials for use with the common data application maintained in the common service network.

28. The method of claim 24, wherein the predetermined condition for transmitting the data session configuration file includes:
 receiving a request for the data session configuration file.

29. The method of claim 24, wherein the predetermined condition for transmitting the data session configuration file includes:
 receiving a registration of the wireless portable communication device using a common registration channel.

30. The method of claim 24, wherein the predetermined condition for transmitting the data session configuration file includes:
 determining the wireless portable communication device failing to properly access the common data application maintained in the common service network.

31. The method of claim 24, wherein the predetermined condition for transmitting the data session configuration file includes:
 reaching a predetermined periodic transmission time interval.

32. The method of claim 31, wherein transmitting the data session configuration file includes:
 broadcasting the data session configuration file.

33. The method of claim 24, wherein the current authentication credentials comprise an access point name (APN) and the data connectivity comprises a packet data protocol (PDP) context.

34. The method of claim 24, wherein the common data application comprises an e-mail application and the messaging service comprises an e-mail service.

35. The method of claim 34, wherein the act of detecting the predetermined condition is based on determining that a subscriber identity module of the wireless portable communication device is associated with the cellular network different from the default cellular network.

36. A method in a common data service network for use in providing appropriate authentication credentials required for submission by a wireless portable communication device when it establishes, via a current cellular network, data connectivity for accessing a common data application maintained in the common data service network adapted to provide a messaging service, the wireless portable communication device having default authentication credentials for submission when it establishes, via a default cellular network, data connectivity for accessing the common data application maintained in the common service network for receiving the messaging service via the default cellular network, the method comprising the acts of:
 maintaining current authentication credentials required for submission by the wireless portable communication device when it establishes, via the current cellular network, data connectivity for the common data application maintained in the common data service network;
 detecting a predetermined condition which is based on a change in subscription for the wireless portable communication device from the default cellular network to the current cellular network;
 transmitting the data session configuration file having the current authentication credentials in response to detecting the predetermined condition; and
 allowing proper access to the common data application maintained in the common data service network for providing the messaging service to the wireless portable communication device via the current cellular network upon receiving the current authentication credentials from the wireless portable communication device when the data connectivity is established via the current cellular network.

37. The method of claim 36, wherein the data session configuration file further includes a list of a plurality of cellular networks mapped against the appropriate authentication credentials for use with the common data application.

38. The method of claim 36, wherein the predetermined condition for transmitting the data session configuration file includes:

receiving a request for the data session configuration file.

39. The method of claim 36, wherein the predetermined condition for transmitting the data session configuration file includes:

determining the wireless portable communication device failing to properly access the common data application maintained in the common service network.

40. The method of claim 36, wherein the predetermined condition for transmitting the data session configuration file includes:

reaching a predetermined periodic transmission time interval.

41. The method of claim 40, wherein transmitting the data session configuration file includes:

broadcasting the data session configuration file.

42. The method of claim 36, wherein the current authentication credentials comprises one of an access point name (APN) for a packet data protocol (PDP) context and a network access identifier (NAI) for a point-to-point protocol (PPP) session.

* * * * *